(12) United States Patent
Chung et al.

(10) Patent No.: US 7,466,995 B2
(45) Date of Patent: Dec. 16, 2008

(54) MOBILE COMMUNICATIONS TERMINAL HAVING MALFUNCTION-PREVENTING FUNCTION

(75) Inventors: Sung-yoon Chung, Seoul (KR); Moo-cheol Ryoo, Bucheon-si (KR)

(73) Assignee: Pantech&Curitel Communications, Inc., Seoul (KR)

( * ) Notice: Subject to any disclaimer, the term of this patent is extended or adjusted under 35 U.S.C. 154(b) by 470 days.

(21) Appl. No.: 11/257,702

(22) Filed: Oct. 25, 2005

(65) Prior Publication Data

US 2006/0141980 A1    Jun. 29, 2006

(30) Foreign Application Priority Data

Dec. 24, 2004  (KR) ...................... 10-2004-0112066

(51) Int. Cl.
*H04B 1/38* (2006.01)
(52) U.S. Cl. ...................... 455/572; 455/573; 455/574; 455/127.1; 320/112; 320/113; 320/114; 320/115
(58) Field of Classification Search ................ 455/572, 455/573, 574, 127.1; 320/112, 113, 114, 320/115
See application file for complete search history.

(56) References Cited

U.S. PATENT DOCUMENTS

| | | | |
|---|---|---|---|
| 6,211,649 B1 * | 4/2001 | Matsuda | 320/115 |
| 2003/0050102 A1 * | 3/2003 | Roh | 455/573 |
| 2003/0201755 A1 * | 10/2003 | Briggs et al. | 320/135 |
| 2005/0046384 A1 * | 3/2005 | Simoes et al. | 320/114 |
| 2005/0242778 A1 * | 11/2005 | Lin | 320/134 |

* cited by examiner

*Primary Examiner*—Sanh D Phu
(74) *Attorney, Agent, or Firm*—H.C. Park & Associates, PLC

(57) ABSTRACT

A mobile communication terminal having a malfunction-preventing function is provided, including a keypad; a voltage source which is activated by voltage supplied to an EN terminal, processes voltage supplied from a battery, and outputs the processed voltage; a power_on switching unit switched on when a switch_on key of the keypad is pressed; a charging terminal supplying voltage supplied upon charging to the EN terminal; a malfunction-preventing unit preventing voltage from being supplied from the charging terminal to the EN terminal while a control signal is input; and a controller which is activated by voltage supplied from the voltage source during a power-off condition, controls the mobile communication terminal by supplying voltage to the EN terminal of the voltage source and receiving voltage from the voltage source, and outputs a control signal to the malfunction-preventing unit only when a power-off process is performed according to a power-off instruction from the keypad.

4 Claims, 3 Drawing Sheets

MOBILE COMMUNICATIONS TERMINAL HAVING MALFUNCTION-PREVENTING FUNCTION

BACKGROUND OF THE INVENTION

This application claims the priority of Korean Patent Application No. 2004-112066, filed on Dec. 24, 2004, in the Korean Intellectual Property Office, the disclosure of which is incorporated herein in its entirety by reference.

1. Field of the Invention

The present invention relates to a mobile communication terminal and, more particularly, to a mobile communication terminal capable of displaying a power-off charging condition.

2. Description of Related Art

Mobile communication terminals providing power-on and power-off charging functions have been currently put on the market at the request of mobile carriers. The power-on charging function implies that when a mobile communication terminal is charged through a charging jack during power-on of the mobile communication terminal, a charging condition is displayed on a display unit of the mobile communication terminal. The power-terminal. The power-off charging function implies that when a mobile communication terminal is charged through a charging jack during power-off of the mobile communication terminal, the mobile communication terminal is powered on and a charging condition is displayed on a display unit of the mobile communication terminal. During a power-on charging condition, the mobile communication terminal provides all functions incorporated therein. However, during a power-off charging condition, the mobile communication terminal provides the power-off charging function but cannot provide other functions. Meanwhile, during the power-off charging condition, there is an advantage in that unnecessary battery consumption is avoided.

FIG. 1 is a schematic circuit diagram of a conventional construction configured to display a power-off charging condition in a mobile communication terminal. When a user presses a switch_on key during power-off of a mobile communication terminal, a signal of the switch_on key ON_SW is inputted to an EN terminal of a DC-DC converter. When the user presses the switch_on key ON_SW during power-off of the mobile communication terminal, a switch connected to a battery and the EN terminal of the DC-DC converter is switched on so that voltage applied from the battery is supplied to the EN terminal. When the voltage is supplied to the EN terminal, the DC-DC converter is activated, adjusts the voltage VBATT applied from the battery to a voltage V_MSM having a level suitable for the mobile communication terminal, and supplies the voltage V_MSM to a controller controlling the mobile communication terminal. The controller outputs a signal PS_HOLD to the EN terminal of the DC-DC converter to obtain an effect of continuously pressing the switch_on key ON_SW. The controller controls the mobile communication terminal using the voltage supplied from the battery. If the user connects a charging jack of a battery charger to the mobile communication terminal which is powered on, it implies that the mobile communication terminal is in the power-on charging condition.

Meanwhile, when the user powers off the mobile communication terminal, the controller performs a power-off process of the mobile communication terminal and stops outputting the PS_HOLD signal to the EN terminal of the DC-DC converter. Consequently, voltage is not supplied from the battery to the controller, thereby powering off the mobile communication terminal. During power-off of the mobile communication terminal, when the user connects a charging jack of a battery charger to the mobile communication terminal, the battery charger charges the battery through the charging terminal and the voltage VCHARGER is supplied to the EN terminal of the DC-DC converter. As a result, the voltage VBATT from the battery is supplied to the controller through the DC-DC converter and the mobile communication terminal is powered on. That is, the mobile communication terminal is in the power-off charging condition.

However, when a user connects the charging jack of the battery charger to the mobile communication terminal during powering-off of the mobile communication terminal, the PS_HOLD signal is in a low state but the voltage VCHARGER of the battery charger is supplied to the EN terminal of the DC-DC converter, whereby the voltage from the battery is supplied to the controller. As a result, there is a problem in that the controller cannot perform the power-off process normally and the mobile communication terminal may stop operating.

SUMMARY OF THE INVENTION

The present invention provides a mobile communication terminal capable of performing a power-off process normally when electrical charging is performed during power-off of the mobile communication terminal.

According to an aspect of the present invention, there is provided a mobile communication terminal that prevents malfunctioning when the mobile communication terminal is electrically charged during power-off of the mobile communication terminal, including: a keypad; a voltage source which is activated by voltage supplied to an EN (enable) terminal, processes voltage supplied from a battery, and outputs the processed voltage; a power_on switching unit which is switched on when a switch_on key of the keypad is pressed so that the voltage from the battery can be supplied to the EN terminal; a charging terminal which supplies voltage supplied upon charging to the EN terminal; a malfunction-preventing unit which prevents voltage from being supplied from the charging terminal to the EN terminal while a control signal is input; and a controller which is activated by voltage supplied from the voltage source during a power-off condition, controls the mobile communication terminal by supplying voltage to the EN terminal of the voltage source and receiving voltage from the voltage source, and outputs a control signal to the malfunction-preventing unit only when a power-off process is performed according to a power-off instruction from the keypad.

The malfunction-preventing unit may be an npn-transistor in which a collector terminal is connected to the charging terminal, an emitter terminal is connected to a ground, and a base terminal is connected to the controller.

The voltage source may be a DC-DC converter or an LDO (Low Drop Out) regulator which adjusts voltage supplied from the battery to a predetermined level and outputs the adjusted voltage.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Exemplary embodiments in accordance with the present invention will now be described in detail with reference to the accompanying drawings.

Figure 1:
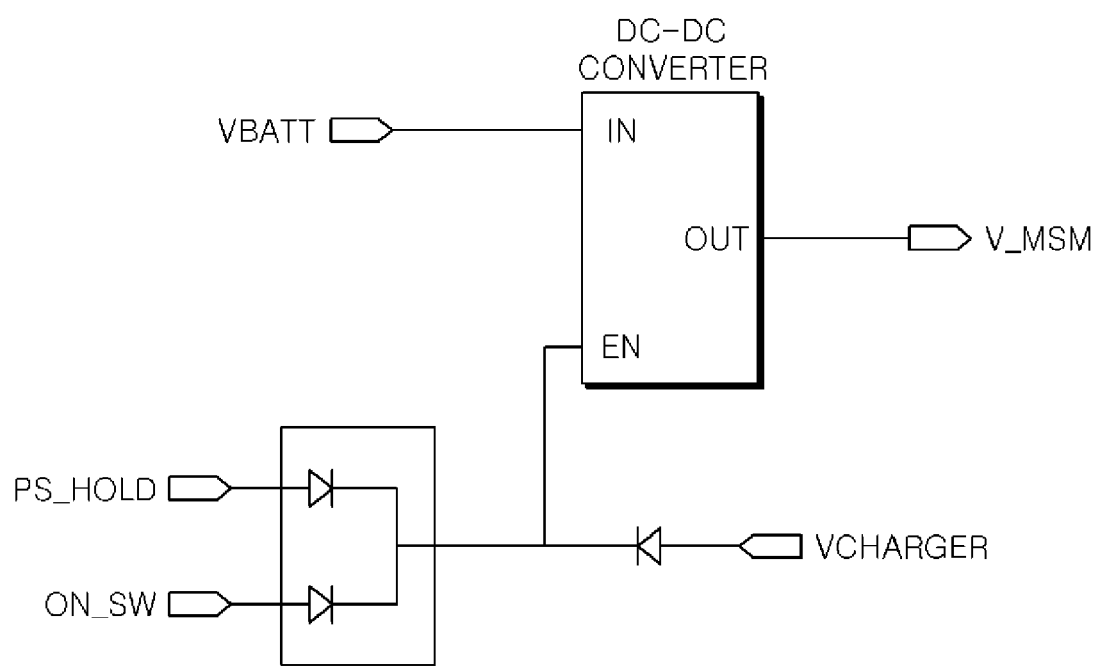
FIG. 1 is a circuit diagram of a conventional construction configured to display a power-off charging condition in a mobile communication terminal.
Figure 2:
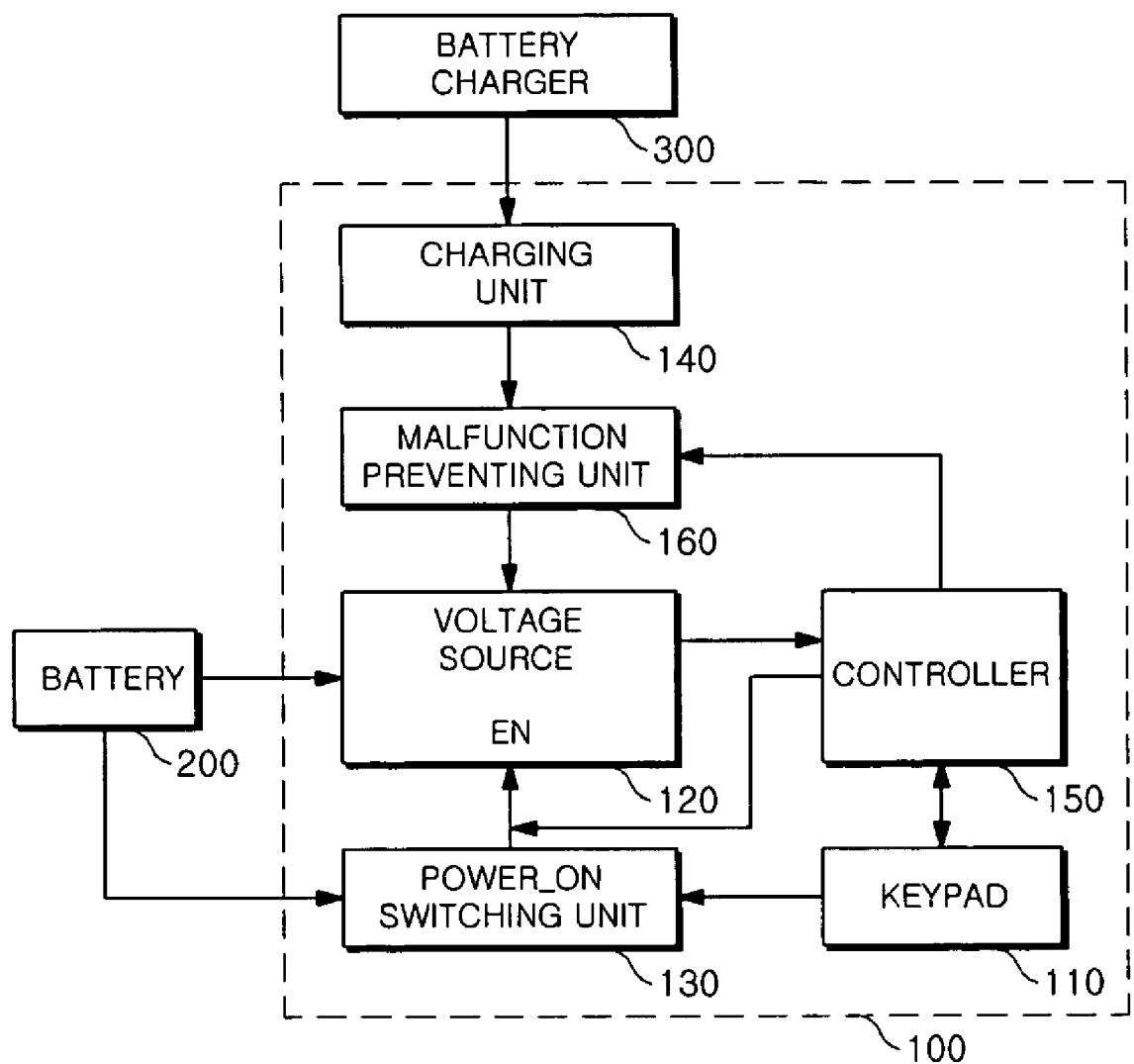
FIG. 2 is a block diagram configured to display a power-off charging condition in a mobile communication terminal in accordance with an embodiment of the present invention.
Figure 3:
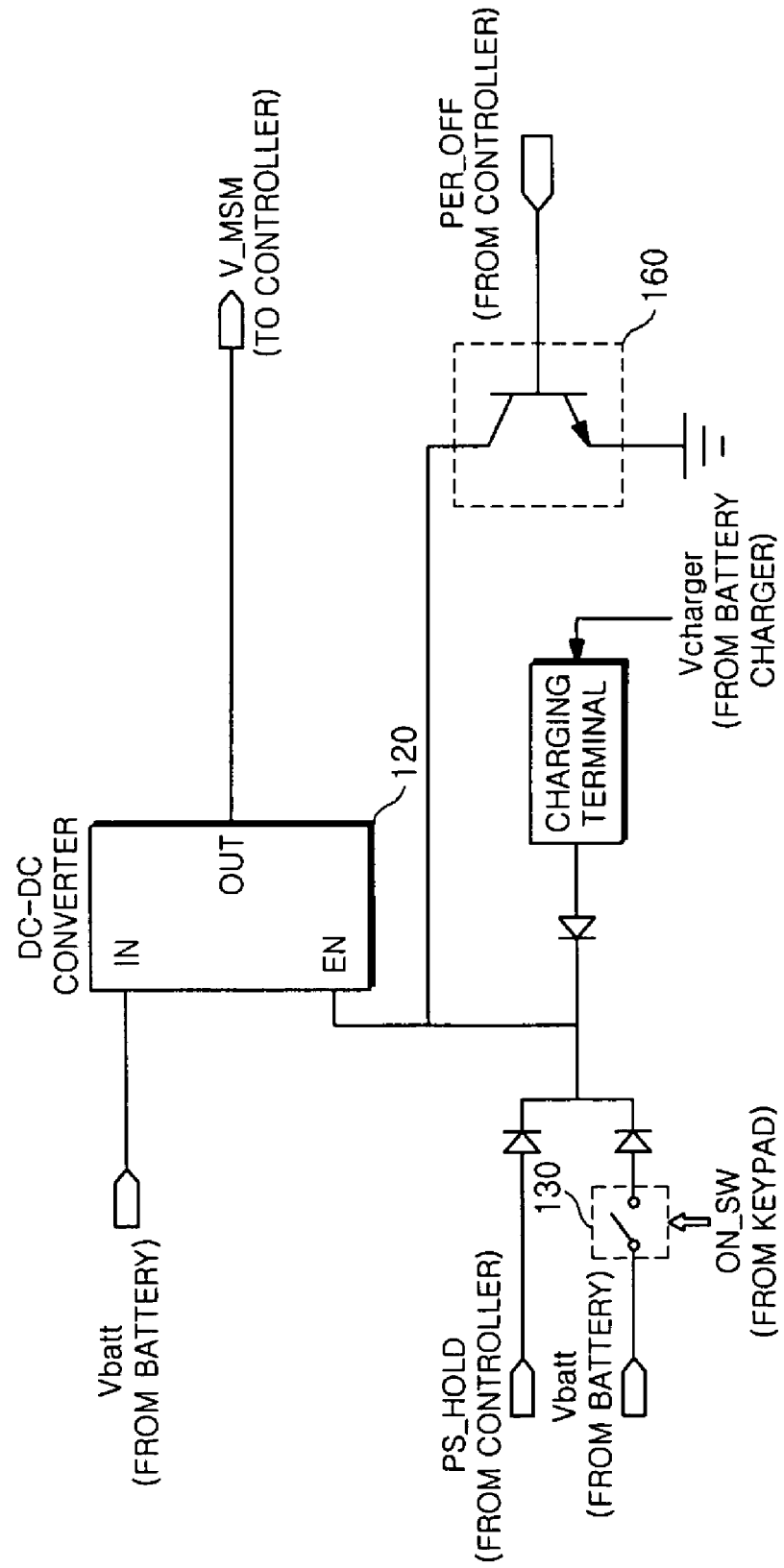
FIG. 3 is a circuit diagram of FIG. 2 in accordance with an embodiment of the present invention.

FIG. 2 is a block diagram configured to display a power-off charging condition in a mobile communication terminal in accordance with an embodiment of the present invention. FIG. 3 is a circuit diagram of FIG. 2 in accordance with an embodiment of the present invention. A mobile communication terminal 100 includes a keypad 110, a voltage source 120, a power_on switching unit 130, a charging terminal 140, a controller 150, and a malfunction-preventing unit 160. The keypad 110 has a typical construction as well-known in the art. The voltage source 120 is activated by voltage supplied to an EN terminal, processes voltage supplied from a battery 200, and supplies it to the controller 150. Examples of the voltage source 120 include a typical DC-DC converter shown in FIG. 3 and a typical LDO (Low Drop Out) regulator. The power_on switching unit 130 is switched on when a user presses a switch_on key (ON_SW) of the keypad 110 while the mobile communication terminal 100 is being turned off. When the power_on switching unit 130 is switched on, the voltage from the battery 200 is supplied to the EN terminal of the voltage source 120.

Meanwhile, Qualcomm's MSM chip is used as the controller 150. The controller 150 is activated by voltage supplied through the voltage source 120 from the battery 200 while the switch_on key (ON_SW) is pressed. The controller 150 applies a PS_HOLD signal to the EN terminal of the voltage source 120 so that the voltage source 120 can be continuously activated. The controller 150 controls the mobile communication terminal using the voltage supplied from the battery 200. The charging terminal 140 is connected to a charging jack of a battery charger 300 and supplies voltage from the battery charger 300 to a charging circuit (not shown). The charging circuit processes the voltage supplied from the battery charger 300 to charge the battery 200.

Also, the charging terminal 140 supplies the voltage from the battery charger 300 to the EN terminal of the voltage source 120 so that the above-mentioned power-off charging condition can be set upon power-off of the mobile communication terminal. That is, when a user connects the charging jack of the battery charger to the mobile communication terminal during power-off of the mobile communication terminal, the charging terminal 140 supplies voltage of the battery charger 300 supplied through the charging jack to the EN terminal of the voltage source 120. The voltage source 120 is then activated, processes the voltage from the battery 200, and supplies it to the controller 150. The controller 150 is activated by the voltage from the voltage source 120 and sets the above-mentioned power-off charging condition.

The malfunction-preventing unit 160 prevents the mobile communication terminal from malfunctioning when the battery of the mobile communication terminal is charged during power-off of the mobile communication terminal by a user using the keypad 110. When the user instructs the controller 150 to power off the mobile communication terminal through the keypad 110, the controller 150 does not output the PS_HOLD signal and performs a power-off process. The controller 150 outputs a control signal PWR_OFF to the malfunction-preventing unit 160.

The malfunction-preventing unit 160 is activated by the PWR_OFF signal from the controller 150. When voltage is applied through the charging terminal, the malfunction-preventing unit 160 prevents the applied voltage from being applied to the voltage source 120. The malfunction-preventing unit 160 may be an npn-transistor. The npn-transistor 160 is turned on by the PWR_OFF signal applied to a base terminal. When the npn-transistor 160 is turned on, a voltage Vcharger of the battery charger 300 applied through the charging terminal 140 is not input to the EN terminal of the voltage source 120 (DC-DC converter or LDO regulator) but is input to a ground terminal through the npn-transistor.

After the power-off process is completed, the controller 150 does not output the PWR_OFF signal and the npn-transistor 160 is thus turned off. The voltage Vcharger of the battery charger 300 applied through the charging terminal 140 is input to the EN terminal of the DC-DC converter 120. The activated DC-DC converter 120 supplies the voltage supplied from the battery to the controller 150. The controller 150 is activated by the voltage supplied from the DC-DC converter 120 and sets the power-off charging condition of the mobile communication terminal.

As apparent from the above description, when a battery charger is connected to charge a battery of a mobile communication terminal while the mobile communication terminal is being powered off, a power-off process is first performed and then the power-off charging condition is set so that the mobile communication terminal can be prevented from malfunctioning.

While the present invention has been described with reference to exemplary embodiments thereof, it will be understood by those skilled in the art that various changes in form and details may be made therein without departing from the scope of the present invention as defined by the following claims.

What is claimed is:

1. A mobile communication terminal that prevents malfunctioning when the mobile communication terminal is electrically charged during power-off of the mobile communication terminal, comprising:
    a keypad;
    a voltage source which is activated by voltage supplied to an EN (enable) terminal, processes voltage supplied from a battery, and outputs the processed voltage;
    a power_on switching unit which is switched on when a switch_on key of the keypad is pressed so that the voltage from the battery can be supplied to the EN terminal;
    a charging terminal which supplies voltage supplied upon charging to the EN terminal;
    a malfunction-preventing unit which prevents voltage from being supplied from the charging terminal to the EN terminal while a control signal is input; and a controller which is activated by voltage supplied from the voltage source during a power-off condition, controls the mobile communication terminal by supplying voltage to the EN terminal of the voltage source and receiving voltage from the voltage source, and outputs a control signal to the malfunction-preventing unit only when a power-off process is performed according to a power-off instruction from the keypad.

2. The mobile communication terminal of claim 1, wherein the malfunction-preventing unit is an npn-transistor in which a collector terminal is connected to the charging terminal, an emitter terminal is connected to a ground, and a base terminal is connected to the controller.

3. The mobile communication terminal of claim 1, wherein the voltage source is a DC-DC converter or an LDO (Low Drop Out) regulator which adjusts voltage supplied from the battery to a predetermined level and outputs the adjusted voltage.

4. The mobile communication terminal of claim 2, wherein the voltage source is a DC-DC converter or an LDO regulator which adjusts voltage supplied from the battery to a predetermined level and outputs the adjusted voltage.

* * * * *